Figure 1:
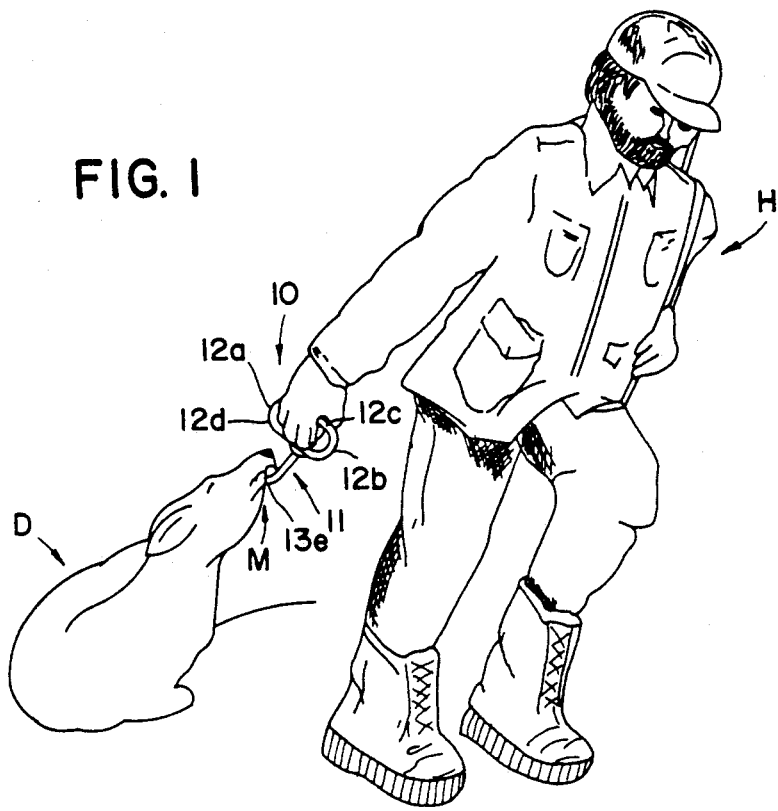

United States Patent [19]

Houghton et al.

[11] Patent Number: 5,029,921
[45] Date of Patent: Jul. 9, 1991

[54] DEER HAULING DEVICE

[76] Inventors: Robert M. Houghton, 5961 Horstmeyer Rd., Lansing, Mich. 48910; Jack V. Houghton, 502 E. Long Lake Rd., Orleans, Mich. 48865

[21] Appl. No.: 550,344
[22] Filed: Jul. 9, 1990
[51] Int. Cl.⁵ .................... A01M 31/00; B65G 7/12
[52] U.S. Cl. .................................. 294/26; 294/137
[58] Field of Search ............. 294/15, 17, 19.1, 19.3, 294/24, 26, 82.1, 137; 43/5, 6; 119/151, 152

[56] References Cited

U.S. PATENT DOCUMENTS

| D. 166,408 | 3/1952 | Oake | 294/26 X |
|---|---|---|---|
| 555,681 | 3/1896 | Dalton | 294/26 |
| 931,339 | 8/1909 | Penington | 294/26 |
| 2,482,314 | 9/1949 | Beckwell | 294/26 |
| 2,488,312 | 11/1949 | Millican et al. | 294/26 |
| 2,812,206 | 11/1957 | Brunn | 294/26 X |
| 2,882,084 | 4/1959 | Eatinger | 294/26 |
| 3,310,331 | 3/1967 | Michaud | 294/26 |
| 4,023,844 | 4/1977 | Roberts | 294/26 |
| 4,580,825 | 4/1986 | Johnson | 294/24 |
| 4,601,505 | 7/1986 | Chilton | 294/26 |
| 4,660,875 | 8/1987 | Ziegler | 294/26 |

FOREIGN PATENT DOCUMENTS

| 74510 | 1/1949 | Norway | 294/26 |
|---|---|---|---|
| 56720 | 1/1923 | Sweden | 294/26 |
| 69720 | 6/1929 | Sweden | 294/26 |
| 901518 | 7/1962 | United Kingdom | 294/26 |

Primary Examiner—Johnny D. Cherry
Attorney, Agent, or Firm—Ian C. McLeod

[57] ABSTRACT

An improved deer hauling device (10) is described. The hauling device includes a handle (12) preferably in the form of an elongated ellipse, secured to one end of an intermediate shank (11), and a spaced apart hook (13) formed from the other end of the shank. The shank is positioned offset from the short axis (a—a) of the handle which bisects the sides (12c, 12d) of the handle so that the apex of the V-shaped hook is centered on the short axis of the handle. This construction helps to distribute the dragging weight evenly across the hunter's palm by preventing the game from sliding along the hook.

5 Claims, 1 Drawing Sheet

U.S. Patent — July 9, 1991 — 5,029,921

DEER HAULING DEVICE

BACKGROUND OF THE INVENTION (1) Field of the Invention

The present invention relates to a deer hauling device for dragging large game from the field after the game has been killed by a hunter. In particular, the present invention relates to a device which has a handle that can be in the form of a straight rod, but which preferably is an oval in the form of an elongated ellipse defined by a long axis and a short axis and with spaced apart straight sides on opposite sides of the long axis, one side of which is gripped by the hunter with fingers in an opening of the oval. A shank is provided on an opposite side of the handle, offset from the short axis of the oval. The distal end of the shank forms a V-shaped hook, the apex of which is centered on the short axis of the oval. The hook is used to engage the lower jaw of the game from underneath the chin so that the chin is secured in the apex of the V-shaped hook. This prevents the game from sliding on the hook as the game is being hauled from the field. Also, the centering of the handle and hook along the short axis helps to evenly distribute the dragging weight across the hunter's palm.

(2) Prior Art

The prior art has described various types of hauling devices. These devices enable a hunter to hook the fallen game so that it can be moved or transported from the field without the hunter having to actually carry the game. The prior art has also described hand held hook devices that are used for moving or hauling bags or bales of a commodity. Illustrative of the prior art hauling devices are U.S. Pat. No. 555,681 to Dalton; U.S. Pat. No. 931,339 to Penington & Chilton; U.S. Pat. No. 2,482,314 to Beckwell; U.S. Pat. No. 2,488,312 to Millican et al; U.S. Pat. No. 3,310,331 to Michaud; U.S. Pat. No. 4,023,844 to Roberts; and U.S. Pat. No. 4,660,875 to Ziegler.

Beckwell describes a gaff hook device, which has a straight rod-like shank section with an inner circular hook formed at its lower end. The upper end of the shank is bent at a right angle to form a straight traverse handle. The handle extends across the palm of the hand and has a loop that slides over the thumb for steadying the gaff hook in the hand.

Roberts describes a large game carrier that normally requires two people to operate. The carrier includes a rectangular cross-sectional pivot block having a game-engaging hook rigidly extending from the front side of the block. The opposed ends of the block provide for arcuate folding and unfolding movement of opposed handles, from a closed position adjacent to and on opposed sides of the hook, to an open position wherein the handles are in-line with each other and at a right angle to the hook. The carrier also provides for an eye bolt rigidly attached to the back side of the block opposite the hook. The eye bolt allows for a rope to be secured to the carrier.

Ziegler describes a hand held hook device which comprises a hand guard with spaced apart side walls extending rearwardly from a front wall. The front wall supports a rigidly mounted hook extending forward from the front wall. A handle extends between the side walls in rearwardly spaced relationship to the front wall. The hook device is completed by a flexible strap which extends between the sidewalls in rearwardly spaced relationship to the handle. In use, the straps are secured around the operator's wrist for stability while the operator grips the handle.

Millican et al is illustrative of those devices that are used to move baled or bagged commodities. The Millican et al device has a cylindrical metal handle with the proximal end of a shank formed of a metal rod attached to one of the ends of the handle. The shank is bent so that the majority of its length is coplanar with and aligned at a right angle to the longitudinal axis of the handle. The distal end of the shank forms a hook which is in a plane perpendicular to the plane formed by the proximal end of the shank and the handle. This construction provides operator access to the handle from the open end of the handle opposite the attached shank.

Michaud shows a very similar construction to that taught by Millican et al except that the proximal end of the shank extends forward from the apex of a U-shaped stirrup. A wooden handle in the form of an oval cylinder is provided between the outer extremities of the opposed legs of the stirrup rearwardly from the apex of the stirrup. The handle is secured to the stirrup by means of a bolt extending between holes provided in each leg of the stirrup and through a bore along the longitudinal axis of the handle. The hook is formed from the distal end of the shank and is in a plane perpendicular to the plane formed by the proximal end of the shank, the stirrup and the handle, in a manner similar to the Millican et al device.

Penington et al shows another type of hay hook device.

U.S. Design Pat. No. 166,408 to Oake teaches a combined hook and axe device with the shank at an angle from the centerline of the handle.

The problem with the prior art devices is that the weight distribution across the handle relative to the hook is poor. This makes it difficult to haul a heavy fluid weight such as a recently killed animal. In general, the hooks of the prior art devices are rounded so that the game tends to slide on the hook as the game is being hauled.

OBJECTS

It is therefore an object of the present invention to provide an improved metal deer hauling device that has an oval handle in the form of an elongated ellipse with a shank secured to the front side of the handle offset from the short axis of the oval handle, so that the apex of a V-shaped hook at the distal end of the shank is centered on the handle's short axis, for even distribution of the dragging weight across the palm of the hunter's hand. Further, it is an object of the present invention to provide a preferred improved deer hauling device which has a handle, a shank, and a hook in a planar relationship so that the hauling device can easily fit into the hunter's pocket for convenient transportation to the field. Still further, it is an object of the present invention to provide an improved deer hauling device which is simple and inexpensive to build and which can be preferably made in a single piece by a drop-forging or casting process, or which can be easily assembled by welding. These and other objects will become increasingly apparent by reference to the following descriptions and to the drawings.

IN THE DRAWINGS

FIG. 1 schematically illustrates the deer hauling device 10 being used by a hunter H to drag a deer D from the field.

Figure 2:
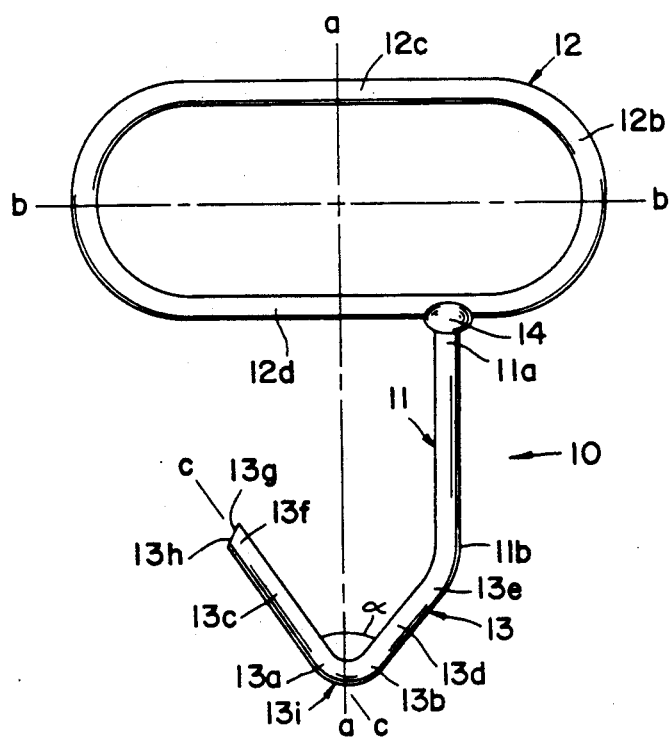

FIG. 2 is a front view of the deer hauling device 10 particularly showing the shank 11, handle 12, and hook 13.

Figure 3:
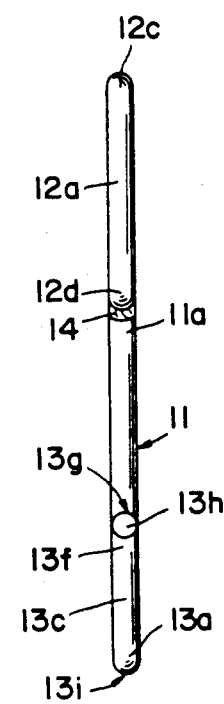

FIG. 3 is a side view of the holder of FIG. 1.

GENERAL DESCRIPTION

The present invention also relates to a large game animal hauling device which comprises:

(a) a handle means having a longitudinal axis such that the fingers grasp the handle means along the longitudinal axis;

(b) a shank means having opposed ends, wherein one of the ends is positioned on the handle means with the shank means on a perpendicular axis offset from a centerline of the longitudinal axis; and (c) a hook means which extends from the other end of the shank means, wherein the hook means is V-shaped and has an apex of the V-shape centered along the centerline of the longitudinal axis so that the apex is directed away from the handle means.

The deer hauling device is preferably constructed of metal. The device can be built in one piece through a drop-forge or casting process, or it can be built by welding the shank and hook to the handle.

SPECIFIC DESCRIPTION

FIGS. 1 to 3 show a deer hauling device 10 which is formed by a shank 11 that is intermediate with and has a cylindrical section in the same plane as a handle 12 and a hook 13. The handle 12 is elliptical in form with opposed curved ends 12a and 12b which extend to and meet parallel spaced apart straight sides 12c and 12d. The handle 12 has a short axis a—a which bisects sides 12c and 12d, and a long axis b—b which bisects opposed ends 12a and 12b and which is parallel with the spaced apart sides 12c and 12d.

The shank 11 has a circular cross-section which has its longitudinal axis parallel with and spaced between the axis a—a and end 12b of handle 12. A proximal end 11a of the shank 11 is secured to side 12d of the handle 12 by intermediate weld 14. A distal end 11b of the shank 11 forms a V-shaped hook 13 with an angle alpha whose apex 13i is centered on the axis a—a of the handle 12. The angle alpha of hook 13 is formed by the proximal ends 13a and 13b, of sections 13c and 13d, respectively. The distal end 13e of section 13d is integral with the distal end 11b of shank 11 while the distal end 13f of rod section 13c is spaced from and faces end 12a of handle 12. The end 13f has a sharp edge 13g on face 13h. The angle alpha is preferably between about 60 degrees and 90 degrees, and preferably at an angle where the axis c—c of section 13c is just outside the handle 12 to prevent the hook from catching in a pocket of the hunter when being carried. The sharp edge 13g is cut so that the plane of the face 13h is angled towards the axis a—a to also prevent cutting of the hunter when the device 10 is carried.

FIG. 1 shows the deer hauling apparatus 10 being used to haul a fallen deer D by a hunter H. The hunter H sets the hook 13 into the lower jaw or mandible M of the deer D by setting the sharp edge 13g of the hook 13 through the skin under the chin so that the distal end 13f of the rod section 13c is adjacent to the deer's tongue and the deer's chin is secured in the apex of the V-shaped hook 13. The hunter H then grips the handle 12 by placing his hand around side 12c of handle 12. Since the apex of the V-shaped hook 13 is hooked under the deer's lower jaw M, the deer D will not slip off the hook 13 as the hunter H hauls the deer D from the field. Most importantly, the deer's jaw does not slide on the hook 13 as the deer is being hauled because the deer's chin is relatively narrow and is therefore secured on the apex of the V-shaped hook 13 formed by the ends 13a and 13b of members 13c and 13d.

It is intended that the foregoing description only be illustrative of the present invention and the invention is limited only by the hereinafter appended claims.

I claim:

1. A large game animal hauling device which comprises:

(a) a handle means having a longitudinal axis with spaced apart sides parallel to the longitudinal axis and connector ends of the handle means between the sides such that the fingers of a user grasp the handle means along one of the sides;

(b) a shank means having opposed ends, wherein one of the opposed ends is positioned on the other of the sides of the handle means with the shank means on a perpendicular axis offset from a centerline between the connector ends of the handle means and through the longitudinal axis wherein two of four of the fingers of a user are on opposite sides of the centerline between the connector ends of the handle means; and (c) a hook means which extends from the other end of the shank means, wherein the hook means is V-shaped and has an apex of the V-shape centered along the centerline so that the apex is directed away from the handle means, wherein the handle means, the shank means and the hook means are coplanar and wherein the hook means can be inserted in the lower mandible of the animal for the hauling and can be carried in a pocket by a hunter prior to use.

2. A large game animal hauling device which comprises:

(a) a handle means in the form of a closed loop having a long axis between opposed parallel sides of the handle means and a short axis which long and short axes bisect the loop, wherein the loop can be gripped with the fingers of a user through an opening provided by the loop on one of the opposed sides;

(b) a shank means having opposed ends wherein one of the ends is positioned on the handle means on the other of the opposed sides with the shank means offset from the short axis of the handle means so as to project away from the loop parallel to the short axis, wherein two of four of the fingers of the user are on opposite sides of the short axis of the handle means; and (c) a hook means which extends from the other end of the shank means wherein the hook means is V-shaped and has an apex of the V-shape centered along the short axis so that the apex is directed away from the handle means, wherein the handle means, the shank means and the hook means are coplanar and wherein the hook means can be inserted through the lower mandible of the animal for the hauling and can be carried in a pocket of a hunter prior to use.

3. The device of claim 2 wherein the closed loop of the handle means is an elongated ellipse with spaced apart curved connector ends and the sides are straight between the curved ends, wherein the long axis of the handle means bisects the spaced apart curved connector ends and the short axis of the handle means bisects the spaced apart sides between the curved connector ends.

4. The device of claim 2 wherein the handle means, the shank means and the hook means have circular cross sections.

5. A method for hauling a game animal which comprises:
(a) providing a handle means having a longitudinal axis with spaced apart sides parallel to the longitudinal axis and connector ends of the handle means between the sides such that the fingers of a user grasp the handle means along one of the sides; a shank means having opposed ends, wherein one of the opposed ends is positioned on the other of the sides of the handle means with the shank means on a perpendicular axis offset from a centerline between the connector ends of the handle means and through the longitudinal axis wherein two of four fingers of a user are on opposite sides of the centerline between the connector ends of the handle means; and a hook means which extends from the other end of the shank means, wherein the hook means is V-shaped and has an apex of the V-shape centered along the centerline so that the apex is directed away from the handle means wherein the handle means, the shank means and the hook means are coplanar and wherein the hook means can be inserted in the lower mandible of the animal for the hauling and can be carried in a pocket by a hunter prior to use;
(b) placing the hook means into the lower jaw of a large game animal after the game animal has been killed; and
(c) hauling the game animal by gripping the handle means with one hand.

* * * * *